United States Patent [19]

Donohue

[11] 4,217,796
[45] Aug. 19, 1980

[54] COMPRESSION REDUCING SYSTEM FOR AN INTERNAL COMBUSTION ENGINE

[75] Inventor: James A. Donohue, Milwaukee, Wis.

[73] Assignee: Outboard Marine Corporation, Waukegan, Ill.

[21] Appl. No.: 942,024

[22] Filed: Sep. 13, 1978

[51] Int. Cl.³ .................... B60K 41/04; F01L 13/08
[52] U.S. Cl. ..................................... 74/860; 74/879; 123/182
[58] Field of Search ............... 123/182, 198 F; 74/858, 74/859, 860, 879

[56] References Cited

U.S. PATENT DOCUMENTS

| | | | |
|---|---|---|---|
| 1,101,935 | 6/1914 | Jacobs et al. | 123/198 F |
| 2,010,526 | 8/1935 | Morehouse | 123/182 |
| 2,146,230 | 2/1939 | Rightmyer | 123/182 |
| 2,321,098 | 6/1943 | Morse | 74/858 |
| 3,710,908 | 1/1973 | Muir | 74/860 |

FOREIGN PATENT DOCUMENTS 847708  8/1952  Fed. Rep. of Germany ........... 123/182
711412  9/1931  France ........................ 123/182
933643  8/1963  United Kingdom ................ 74/860

Primary Examiner—Charles J. Myhre
Assistant Examiner—Andrew M. Dolinar
Attorney, Agent, or Firm—Michael, Best & Friedrich

[57] ABSTRACT

An apparatus for delivering power to a power driven device comprises an engine having a combustion chamber and including a compression relief system for venting the combustion chamber with the atmosphere on a selective basis. The apparatus further includes a transmission mechanism for operatively connecting the engine with the power driven device, which transmission mechanism has a drive position for powering the power driven device and a neutral position for operatively disconnecting the engine from the power driven device. A compression relief control mechanism permits venting through the compression relief system when the transmission mechanism is in the neutral position and prevents venting through the compression relief system when the transmission mechanism is in the drive position.

24 Claims, 3 Drawing Figures

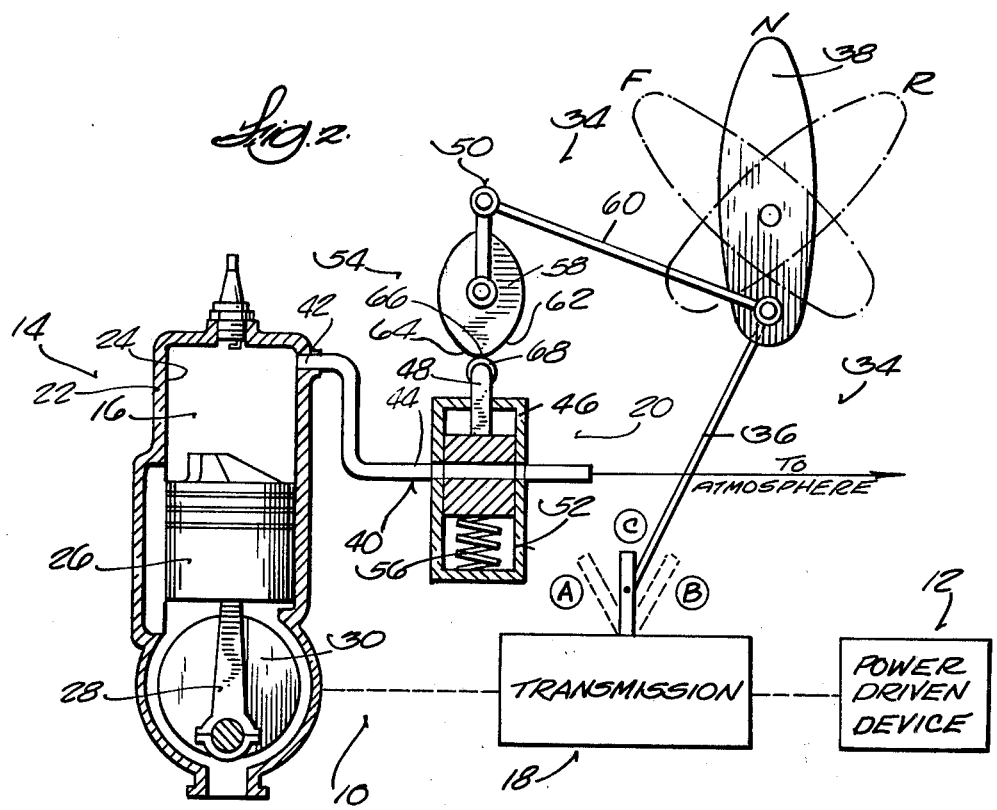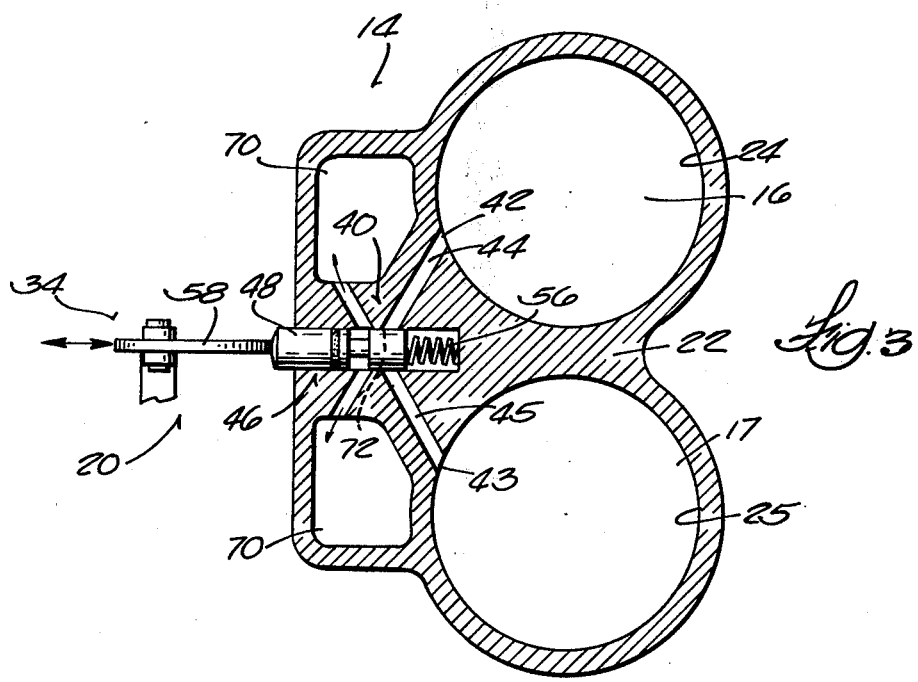

COMPRESSION REDUCING SYSTEM FOR AN INTERNAL COMBUSTION ENGINE

BACKGROUND OF THE INVENTION

I. Field of the Invention

The invention relates to internal combustion engines and, more particularly, to compression reducing systems for internal combustion engines.

II. Description of the Prior Art

Conventional internal combustion engines have employed compression reducing systems to vent the combustion chamber with the atmosphere to facilitate initial cranking of the engine by the starter mechanism. While initial cranking is occurring, it is desirable to dispose the transmission mechanism of the engine in the neutral position to prevent damage to the engine and the starter mechanism. After the engine has started it is desirable to effectuate a smooth and silent shift of the transmission mechanism from the neutral to the in gear position to reduce wear of the engine and transmission mechanism.

None of the known conventional compression reducing systems coordinate the operation of the compression relief system with the operation of the transmission mechanism so as to encourage starting the engine in neutral and to effectuate a smooth and silent shift between the neutral and the in gear positions.

SUMMARY OF THE INVENTION

The invention provides a compression reducing system for an internal combustion engine, which system operates in response to the transmission control mechanism of the engine.

More specifically, the invention provides an apparatus for delivering power to a power driven device comprising an engine having a combustion chamber and including compression relief means for selectively venting the combustion chamber with the atmosphere. The apparatus includes transmission means for operatively connecting the engine with the power driven device, which transmission means has a drive position in which the engine powers the power driven device and a neutral position in which the engine is operatively disconnected from the power driven device. Compression relief control means is provided for permitting the venting through the compression relief means when the transmission means is in the neutral position and for preventing the venting through the compression relief means when the transmission means is in the drive position.

In accordance with one embodiment of the invention, the compression relief means includes a bore venting the combustion chamber with the atmosphere, and a member movable in the bore between an open position permitting the venting through the bore and a closed position preventing the venting through the bore.

In accordance with another embodiment of the invention, the combustion chamber is defined by a wall having an internal surface and includes a piston mounted for movement in the combustion chamber, and the bore includes an aperture in the interior surface and a conduit which is located in the wall and which connects the aperture with the atmosphere. In this embodiment, the movable member includes a valve member movable in the conduit between the open and closed positions.

In accordance with another embodiment of the invention, the compression relief control means includes first activating means for maintaining the valve member in the closed position when the transmission means is in the drive position and second activating means for moving the valve member to the open position in response to movement of the transmission means from the drive to the neutral position.

In accordance with yet another embodiment of the invention, the first activating means includes spring means for biasing the valve member toward the closed position. In this embodiment, the transmission means includes mechanical linkage means for manually controlling the disposition of the transmission means, which mechanical linkage means is movable between a first position for maintaining the transmission means in the drive position and a second position for maintaining the transmission means in the neutral position. Also in this embodiment, the second activating means includes cam means operatively connected with the mechanical linkage means and the valve member for permitting biasing of the valve member toward the closed position by the spring means when the mechanical linkage means is in the first position and for displacing the movable member from the closed to the open position against the action of the spring means in response to the movement of the mechanical linkage means from the first position to the second position.

In accordance with still another embodiment of the invention, the transmission means powers the power driven device in a forward direction when in the drive position, and the transmission means further includes a second drive position for powering the power driven device in a reverse direction. In this embodiment, the compression relief control means is operative for preventing the venting through the compression relief means when the transmission is in both the drive and the second drive positions.

In accordance with another embodiment of the invention, the engine includes a second combustion chamber, and the compression relief means includes means for simultaneously partially venting the second combustion chamber in common with the first combustion chamber.

One of the principal features of the invention is the provision of a compression reducing system for an internal combustion engine, which system is operatively linked with the transmission control mechanism of the engine and thus functions without additional operator effort.

Another of the principal features of the invention is the provision of a compression reducing system for an internal combustion engine, which system reduces the starting effort only when the transmission mechanism is in neutral, which thereby encourages starting of the engine in neutral.

Yet another of the principal features of the invention is the provision of a compression reducing system for an internal combustion engine, which system reduces engine power only in neutral, which thereby reduces the engine speed differential between neutral and in gear operation to affect a smooth shifting of the transmission mechanism.

Other features and advantages of the embodiments of the invention will become apparent upon reviewing the following general description, the drawings and the appended claims.

DESCRIPTION OF THE DRAWINGS

FIG. 2 is an expanded and partially diagrammatic view of the apparatus of FIG. 1, except that the transmission is disposed in the neutral position and the combustion chamber is vented with the atmosphere; and FIG. 3 is a top, fragmentary and partially diagrammatic view of an apparatus similar to the one shown in FIG. 1, except an engine having two combustion chambers is shown.

Figure 1:
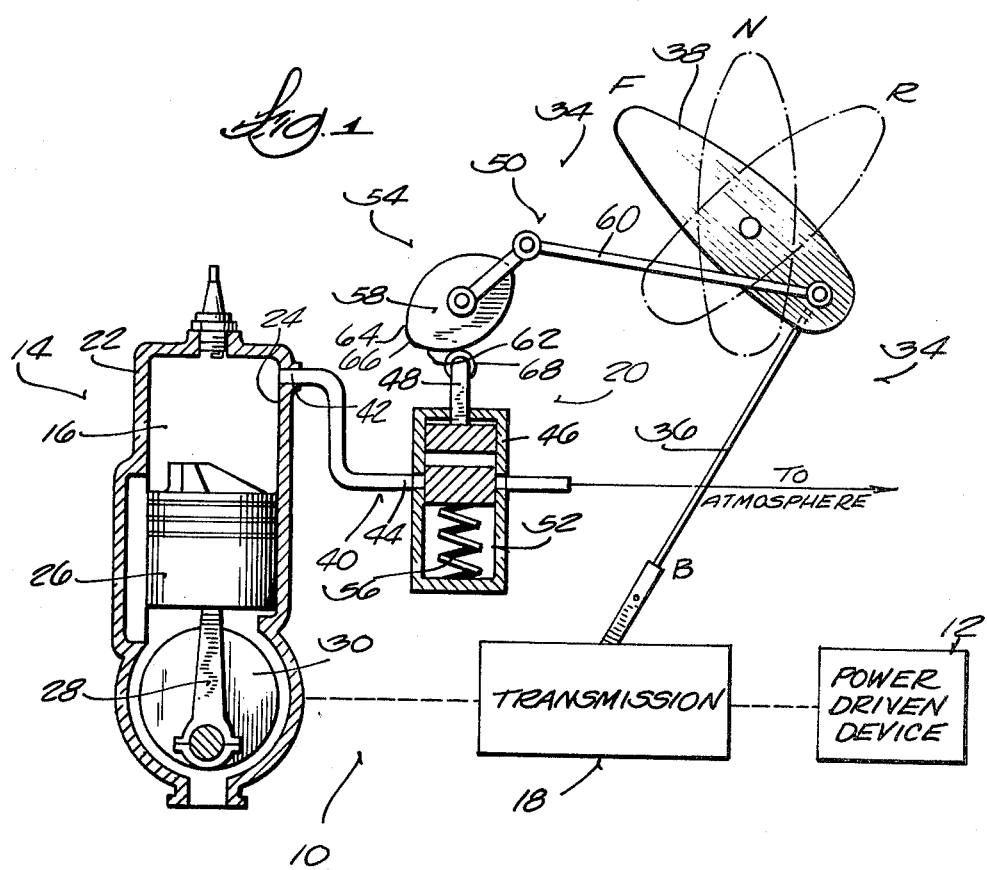
FIG. 1 is a fragmentary and partially diagrammatic view of an apparatus for delivering power to a power driven device, which apparatus embodies various of the features of the invention.

Before explaining various of the embodiments of the invention in detail, is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 is an apparatus 10 for delivering power to a power driven device 12, which apparatus 10 embodies various of the features of the invention. Generally, the apparatus 10 includes an engine 14 having a combustion chamber 16, transmission means 18 for operatively connecting the engine 14 with the power driven device 12, and a compression reducing system 20 operable to partially and selectively vent the combustion chamber 20 with the atmosphere.

Referring first to the engine 14, and realizing that various engine constructions can be used, a block wall 22 having an interior surface 24 defines the combustion chamber 16. A piston 26 is mounted for reciprocative movement in the combustion chamber 16 and is connected by a connecting rod 28 to a crank shaft 30. Combustion of an air-fuel mixture introduced into the combustion chamber 16 by suitable means, such as a carburetor (not shown), causes reciprocative movement of the piston 26, which in turn drives the crank shaft 30.

Referring next to the transmission means 18, and also realizing that various transmission constructions can be used, a conventional transmission mechanism 18 having a plurality of intermeshing gears (not shown) operatively connects the crank shaft 30 with the power driven device 12. The transmission mechanism 18 is operable between three positions; namely, a first drive position (shown in phantom lines in FIG. 2 as position A) in which the power driven device 12 is powered by the engine 14 in the forward direction, a second drive position (shown in phantom lines in FIG. 2 as position B) in which the power driven device 12 is powered by the engine 14 in the reverse direction, and a third, or neutral, position (shown in solid lines in FIG. 2 as position C), in which the power driven device 12 is operatively disconnected from the engine 14.

Shifting means 34 is provided by which the operator of the power driven device 12 can manually shift the transmission mechanism 18 between its three positions. The shifting means 34 may be variously constructed, and, for example, be electrically or hydraulically operated. In the illustrated embodiment, a mechanical linkage assembly 36 is shown which is operatively connected at one end to the transmission mechanism 18 and at the other end to a gear shift handle 38. The gear shift handle 38 has a first position (shown in solid lines in FIG. 1 as position F) in which the mechanical linkage assembly 36 maintains the transmission mechanism 18 in the first drive position, a second position (shown in phantom lines in FIG. 1 as position N) in which the mechanical linkage assembly 36 maintains the transmission mechanism 18 in the neutral position, and a third position (shown in phantom lines in FIG. 1 as position R) in which the mechanical linkage assembly 36 maintains the transmission mechanism 18 in the reverse position. By virtue of this construction, manual movement of the gear shift handle 38 by the operator of the power driven device 12 can control the disposition of the transmission mechanism 18.

Referring next to the compression reducing system 20, in the illustrated embodiment, compression relief means 40 is provided for partially venting the combustion chamber 16 with the atmosphere. The construction of the compression relief means 40 may vary, and it depends in large part upon the construction of the engine 14 itself. In the illustrative embodiment, an aperture 42 is provided in the interior surface 24 of the block wall 22, and a compression relief conduit 44 communicating with the aperture 42 passes through the block wall 22 thereby defining a venting passage between the combustion chamber 16 and the atmosphere.

When the combustion chamber 16 is vented with the atmosphere, the volume of air encountered by the piston 26 during its reciprocative movement in the combustion chamber 16 is reduced, which thereby reduces the motive power necessary to affect such reciprocation. It is particularly desirable to so facilitate piston reciprocation during initial cranking of the engine 14 by the starter mechanism (not shown). However, it is normally not desirable to vent the combustion chamber 16 with the atmosphere during normal engine operation, for such venting may substantially diminish the engine speed, and thus the power output attainable by the engine 14. It is therefore desirable to be able to selectively control the times at which the venting occurs.

While there are various means for controlling the time at which venting through the compression relief conduit 44 occurs, in the illustrated embodiment, a valve member 46, such as a conventional slide valve, is placed in line with the compression relief conduit 44. The valve member 46 includes plunger arm 48 operable to move the valve member 46 between an open position which permits the venting between the combustion chamber 16 and the atmosphere and a closed position which prevents the venting from occurring.

Prior engine constructions have included a valve member which was constructed so as to be manually movable to the open position by the engine operator when the engine was being started to thereby reduce the starting effort. On the other hand, prior valve members could be operatively connected with associated starter mechanisms to automatically open the valve members when the engines were cranked by the starter mechanisms. In both of these prior constructions, the valve members 46 were returned, either manually or automatically, to the closed position once the engines were started.

In these prior constructions, the engine experienced a drop in engine speed when the transmission mechanism was shifted from the neutral position to either the forward or reverse in gear positions. This drop in engine speed was caused by the additional load encountered by the engine when it was shifted into either the forward or reverse positions. To accommodate this speed differential, it was necessary to set the neutral engine speed high enough so that the engine did not stall when placed into gear. The high idle speed thus necessitated by these prior constructions often resulted in a rough and noisy shifting sequence.

As shown in FIG. 1, the apparatus 10 includes compression relief control means 50 for permitting the venting through the compression relief conduit 44 when the transmission mechanism 18 is disposed in the neutral position, and for preventing the venting through the compression relief conduit 44 when the transmission mechanism 18 is disposed in the forward and reverse in gear positions. Specifically, the compression relief control means 50 includes first activating means 52 for maintaining the valve member 46 in the closed position when the transmission mechanism 18 is in the forward or reverse positions, and second activating means 54 for moving the valve member 46 to the open position in response to movement of the transmission mechanism 18 from the forward or reverse positions to the neutral position.

While the first and second activating means 52 and 54 may be variously constructed, which constructions depend in large part upon the construction of the transmission mechanism 18 and the linkage assembly 36 operatively connected thereto, in the illustrated embodiment, the first activating means 52 is a spring 56 which biases the valve member 46 toward the closed position. The second activating means 54 is a cam 58 which is operatively connected with the shifting means 34 and the plunger 48 of the valve member 46.

More particularly, and as shown in FIGS. 1 and 2, a cam linkage assembly 60 is operative to rotate the cam 58 in response to movement of the gear shift handle 38 between its three operative positions. Rotation of the cam 58 by the gear shift handle 38 sequentially causes three cam surfaces 62, 64, and 66 to bear against a bearing surface 68 located on the plunger 48.

As shown in FIG. 1, the first cam surface 62 bears against the bearing surface 68 when the gear shift handle 38 is disposed in the forward drive position. In similar fashion, the second cam surface 64 bears against the bearing surface 68 when the gear shift handle 38 is disposed in the rear drive position. When the first or second cam surface 62 and 64 are thusly positioned, the spring 56 is permitted to fully bias the valve member 46 toward the closed position. By virtue of this construction, venting between the combustion chamber 16 and the atmosphere is prevented when the transmission mechanism 18 is in either in gear position, thus assuring maximum power output to effectively drive the power driven device 12.

Referring now to FIG. 2, the third cam surface 66 bears against the bearing surface 68 when the gear shift handle 38 is disposed in the neutral position. Unlike the first and second cam surfaces 62 and 64, the third cam surface 66 is sloped to displace the plunger 48 against the action of the spring 56 and thereby move the valve member 46 to the open position. By virtue of this construction, venting between the combustion chamber 16 and the atmosphere through the compression relief conduit 44 is permitted when the transmission mechanism 32 is disposed in the neutral position. Starting of the engine 14 when the transmission mechanism 18 is disposed in the neutral position is thereby encouraged, because it is in this position that venting facilitates piston reciprocation. In addition, once the engine 14 is started, the reduced engine speed caused by the venting when the transmission mechanism 18 is in the neutral position equalizes with the engine speed encountered when the transmission mechanism 18 is subsequently shifted to either in gear and non-vented positions. This equalization of engine speeds between the neutral and in gear positions results in a smoother and more silent shifting sequence.

It should be apparent that the first actuating means 52 need not be the biasing spring 56. For example, the plunger 48 may be operatively connected to the cam 58 by means of a suitable cam-follower assembly, which is operative to displace the plunger 48 to open and close the valve member 46 in response to rotation of the cam 60.

As heretofore described, the apparatus 10 includes only a single combustion chamber 16. However, as shown in FIG. 3 the compression relief means 40 and valve member 46 assembly as above described is applicable for use with an apparatus 10 employing more than one combustion chamber 16. Components of the FIG. 3 embodiment which are common to the embodiment illustrated in FIGS. 1 and 2 are assigned common reference numerals.

As shown in FIG. 3, an engine 14 includes a block wall 22 having interior surfaces 24 and 25 and defining two combustion chambers 16 and 17. In this construction, the compression relief means 40 includes a first and second aperture 42 and 43 in the respective interior surfaces 24 and 25, as well as a first and second compression relief conduit 44 and 45, each conduit 44 and 45 passing through the block wall 22 and venting the respective combustion chamber 16 and 17 with the atmosphere, such as through the exhaust manifold 70 of the engine 14. The first and second compression relief conduits 44 and 45 are disposed so as to share a common intersecting point 72, which thus vents the two combustion chambers 16 and 17 in common with the atmosphere.

In this construction, the valve member 46 communicates with the common intersecting point 72 such that, when in the closed position, (as shown in FIG. 3), neither compression relief conduit 44 or 45 communicates with the atmosphere, and when in the open position, both compression relief conduits 44 and 45 communicate in common with the atmosphere. As before described, the valve member 46 includes a plunger 48 operable to open the valve member 46, a spring 56 biasing the valve member 46 in the closed position when the transmission mechanism 18 is in the in gear positions, and a cam 58 operable to displace the plunger 48 against the action of the spring 56 to open the valve member 46 in response to movement of the shifting means 34 from the in gear positions to the neutral position. Thus, operation of the compression reducing system 20 in FIG. 3 is as heretofore described with regard to FIGS. 1 and 2.

Various of the features of the invention are set forth in the following claims.

What is claimed is:

1. An apparatus for delivering power to a power driven device, which apparatus comprises an engine having a combustion chamber and including compression relief means for selectively venting said combustion chamber with the atmosphere, transmission means for operatively connecting said engine with the power driven device, said transmission means having a drive position in which said engine powers the power driven device and a neutral position in which said engine is operatively disconnected from the power driven device, and compression relief control means for permitting the venting through said compression relief means when said transmission means is in said neutral position and for preventing the venting through said compression relief means at all times when said transmission means is in said drive position.

2. An apparatus according to claim 1 wherein said compression relief means includes a bore venting said combustion chamber with the atmosphere, and a member movable in said bore between an open position permitting the venting through said bore and a closed position preventing the venting through said bore.

3. An apparatus according to claim 2 wherein said combustion chamber is defined by a wall having an interior surface, wherein said combustion chamber includes a piston mounted for movement in said combustion chamber, wherein said bore includes an aperture in said interior surface and a conduit in said wall connecting said aperture with the atmosphere, and wherein said movable member communicates with said conduit.

4. An apparatus according to claim 2 wherein said movable member includes a valve member movable in said bore between said open and closed positions.

5. An apparatus according to claim 2 wherein said compression relief control means includes first activating means for maintaining said movable member in said closed position when said transmission means is in said drive position and second activating means for moving said movable member to said open position in response to movement of said transmission means from said drive to said neutral position.

6. An apparatus according to claim 5 wherein said first activating means includes spring means for biasing said movable member toward said closed position.

7. An apparatus according to claim 6 wherein said transmission means includes mechanical linkage means for manually controlling the disposition of said transmission means, said mechanical linkage means being movable between a first position for maintaining said transmission means in said drive position and a second position for maintaining said transmission means in said neutral position, and wherein said second activating means includes cam means operatively connected with said mechanical linkage means and said movable member for permitting biasing of said movable member toward said closed position by said spring means when said mechanical linkage means is in said first position and for displacing said movable member from said closed to said open position against the action of said spring means in response to movement of said mechanical linkage means from said first position to said second position.

8. An apparatus according to claim 1 wherein said transmission means powers the power driven device in a forward direction when in said drive position, wherein said transmission means further includes a second drive position for powering the power driven device in a reverse direction, and wherein said compression relief control means is operative for preventing the venting through said compression relief means when said transmission is in said drive and said second drive positions.

9. An apparatus according to claim 1 wherein said engine includes a second combustion chamber, and wherein said combustion relief means includes means for simultaneously partially venting said second combustion chamber in common with said first combustion chamber.

10. An apparatus for delivering power to a power driven device, which apparatus comprises an engine having a combustion chamber defined by a wall having an interior surface, a piston mounted for movement in said combustion chamber, an aperture in said interior surface, a conduit in said wall connecting said aperture, and thus said combustion chamber, with the atmosphere, a valve member movable in said conduit between an open position permitting venting through said conduit with the atmosphere and a closed position preventing venting through said conduit with the atmosphere, transmission means for operatively connecting said engine with the power driven device, said transmission means having a drive position in which said engine powers the power driven device in a forward direction, a second drive position in which said engine powers the power driven device in a reverse direction, and a neutral position in which said engine is operatively disconnected from the power driven device, first compression relief control means for maintaining said valve member in said closed position at all times when said transmission means is in said drive and second drive positions, and second compression relief control means for maintaining said valve member in said open position when said transmission means is in said neutral position.

11. An apparatus according to claim 10 wherein said transmission means includes mechanical linkage means for manually controlling the disposition of said transmission means, said mechanical linkage means being movable between a first position for maintaining said transmission means in said drive position, a second position for maintaining said transmission means in said neutral position, and a third position for maintaining said transmission means in said reverse position, wherein said first compression relief control means includes spring means for biasing said valve member toward said closed position, and wherein said second compression relief control means includes cam means operatively connected with said mechanical linkage means and said valve member for permitting biasing of said valve member toward said closed position by said spring means when said mechanical linkage means is in said first and third positions and for displacing said valve member from said closed to said open position against the action of said spring means in response to movement of said mechanical linkage means from said first position to said second position and from said third position to said second position.

12. An apparatus according to claim 11 wherein said engine includes a second combustion chamber defined by a second wall having an interior surface and including a second piston mounted for movement in said second combustion chamber, said engine further including a second aperture in said interior surface of said second wall, a second conduit in said second wall connecting said second aperture, and thus said second combustion chamber, with the atmosphere, said second conduit communicating in common with said conduit of said first combustion chamber, and wherein said valve member is movable between an open position permitting venting through said first and second conduits with the atmosphere in response to said cam means and a closed position preventing venting through said first and second conduits with the atmosphere in response to said spring means.

13. An engine for powering a power driven device, which engine comprises a combustion chamber, transmission means for delivering power from the engine to the power driven device, said transmission means having a drive position in which the engine powers the power driven device and a neutral position in which the engine is operatively disconnected from the power driven device, compression relief means for selectively venting said combustion chamber with the atmosphere, compression relief control means for permitting the venting through said compression relief means when said transmission means is in said neutral position and for preventing the venting through said compression relief means at all times when said transmission means is in said drive position.

14. An engine according to claim 13 wherein said compression relief means includes a bore venting said combustion chamber with the atmosphere, and a member movable in said bore between an open position permitting the venting through said bore and a closed position preventing the venting through said bore.

15. An engine according to claim 14 wherein said combustion chamber is defined by a wall having an interior surface, wherein said combustion chamber includes a piston mounted for movement in said combustion chamber, wherein said bore includes an aperture in said interior surface and a conduit in said wall connecting said aperture with the atmosphere, and wherein said movable member communicates with said conduit.

16. An engine according to claim 14 wherein said movable member includes a valve member movable in said bore between said open and closed positions.

17. An engine according to claim 14 wherein said compression relief control means includes first activating means for maintaining said movable member in said closed position when said transmission means is in said drive position and second activating means for moving said movable member to said open position in response to movement of said transmission means from said drive to said neutral position.

18. An engine according to claim 17 wherein said first activating means includes spring means for biasing said movable member toward said closed position.

19. An engine according to claim 18 wherein said transmission means includes mechanical linkage means for manually controlling the disposition of said transmission means, said mechanical linkage means movable between a first position for maintaining said transmission means in said drive position and a second position for maintaining said transmission means in said neutral position, and wherein said second activating means includes cam means operatively connected with said mechanical linkage means and said movable member for permitting biasing of said movable member toward said closed position by said spring means when said mechanical linkage means is in said first position and for displacing said movable member from said closed to said open position against the action of said spring means in response to movement of said mechanical linkage means from said first position to said second position.

20. An engine according to claim 13 wherein said transmission means powers the power driven device in a forward direction when in said drive position, wherein said transmission means further includes a second drive position for powering the power driven device in a reverse direction, and wherein said compression relief control means is operative for preventing the venting through said compression relief means when said transmission is in said drive and said second drive positions.

21. An engine according to claim 13 wherein said engine includes a second combustion chamber, and wherein said combustion relief means includes means for simultaneously partially venting said second combustion chamber in common with said first combustion chamber.

22. An engine for powering a power driven device, which engine comprises a combustion chamber defined by a wall having an interior surface and including a piston mounted for movement in said combustion chamber, said engine including an aperture in said interior surface, a conduit in said wall connecting said aperture, and thus said combustion chamber, with the atmosphere, a valve member movable in said conduit between an open position permitting venting through said conduit with the atmosphere and a closed position preventing venting through said conduit with the atmosphere, transmission means for delivering power from the engine to the power driven device, said transmission means having a drive position in which said engine powers the power driven device in a forward direction, a second drive position in which said engine powers the power driven device in a reverse direction, and a neutral position in which said engine is operatively disconnected from the power driven device, first compression relief control means for maintaining said valve member in said closed position at all times when said transmission means is in said drive and said second drive positions, and second compression relief control means for maintaining said valve member in said open position when said transmission means is in said neutral position.

23. An engine according to claim 22 wherein said transmission means includes mechanical linkage means for manually controlling the disposition of said transmission means, said mechanical linkage means being movable between a first position for maintaining said transmission means in said drive position, a second position for maintaining said transmission means in said neutral position, and a third position for maintaining said transmission means in said reverse position, wherein said first compression relief control means includes spring means for biasing said valve member toward said closed position, and wherein said second compression relief control means includes cam means operatively connected with said mechanical linkage means and said valve member for permitting biasing of said valve member toward said closed position by said spring means when said mechanical linkage means is in said first and said third positions and for displacing said valve member from said closed to said open position against the action of said spring means in response to movement of said mechanical linkage means from said first position to said second position and from said third position to said second position.

24. An engine according to claim 23 wherein said engine includes a second combustion chamber defined by a second wall having an interior surface and including a second piston mounted for movement in said second combustion chamber, said engine further including a second aperture in said interior surface of said second wall, a second conduit in said second wall connecting said second aperture, and thus said second combustion chamber, with the atmosphere, said second conduit communicating in common with said conduit of said first combustion chamber, and wherein said valve member is movable between an open position permitting common venting through said first and second conduits to the atmosphere in response to said cam means and a closed position preventing common venting through said first and second conduits to the atmosphere in response to said spring means.

* * * * *